(12) United States Patent
Nakano et al.

(10) Patent No.: US 7,269,999 B2
(45) Date of Patent: Sep. 18, 2007

(54) THERMAL AIRFLOW METER (75) Inventors: Hiroshi Nakano, Hitachi (JP);
Masamichi Yamada, Hitachinaka (JP);
Masahiro Matsumoto, Hitachi (JP);
Izumi Watanabe, Hitachinaka (JP);
Keiji Hanzawa, Mito (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 81 days.

(21) Appl. No.: 10/560,896

(22) PCT Filed: Mar. 5, 2006

(86) PCT No.: PCT/JP2004/002906

§ 371 (c)(1),
(2), (4) Date: Dec. 16, 2005

(87) PCT Pub. No.: WO2004/113848

PCT Pub. Date: Dec. 29, 2004

(65) Prior Publication Data

US 2007/0089503 A1    Apr. 26, 2007

(30) Foreign Application Priority Data

Jun. 18, 2003  (JP) ............................. 2003-173158

(51) Int. Cl.
*G01F 1/68* (2006.01)
(52) U.S. Cl. .................................... 73/202.5
(58) Field of Classification Search ............. 73/202.5, 73/204.19, 204.22, 204.23, 204.26

See application file for complete search history.

(56) References Cited

U.S. PATENT DOCUMENTS

| 4,916,948 A | * | 4/1990 | Inada et al. ................. 73/202.5 |
| 5,299,594 A | * | 4/1994 | Lord et al. ............. 137/101.19 |
| 7,051,589 B2 | * | 5/2006 | Igarashi et al. ............. 73/202.5 |

FOREIGN PATENT DOCUMENTS

| JP | 61-239119 | 10/1986 |
| JP | 10-197309 | 7/1998 |
| JP | 2001-311637 | 11/2001 |
| JP | 2002-181602 | 6/2002 |
| JP | 33366818 | 11/2002 |

* cited by examiner

*Primary Examiner*—Jewel Thompson
(74) *Attorney, Agent, or Firm*—Mattingly, Stanger, Malur & Brundidge, P.C.

(57) ABSTRACT

A thermal airflow meter excellent in flow-rate measurement accuracy is provided. The airflow meter has a flow-rate measuring element comprising a heat resistor and a temperature-compensating resistor which are formed on the a first base member. A second base member of the airflow meter, provided with a drive circuit and a signal processor, is housed in a casing holding the flow-rate measuring element. The flow-rate measuring element is disposed in an air passage. Of two temperature sensors for measuring temperature at each of two points in the thermal airflow meter, respectively, a first temperature sensor is provided on the fist substrate of the flow-rate measuring element, and a second temperature sensor is provided inside the casing. The signal processor has a function of computing an airflow rate, an air temperature, and an air passage wall face temperature on the basis of an output signal of the flow-rate measuring element and respective output signals of the first and second sensors.

10 Claims, 9 Drawing Sheets

FIG. 18

THERMAL AIRFLOW METER

TECHNICAL FIELD

The present invention relates to a thermal airflow meter for measuring an airflow rate, and more particularly, to an airflow meter suitable for measuring an intake airflow rate of an internal combustion engine.

BACKGROUND ART

As a device for measuring an intake airflow rate in an internal combustion engine, a system, in which a heat resistor with temperature-dependence and a resistor (temperature-compensating resistor) for temperature-compensation of the heat resistor are disposed in an intake air passage (air passage) to measure the intake airflow rate, is well known.

With this type of an airflow meter, even if heat of the heat resistor is released into airflow, a heating current flowing into the heat resistor is controlled so that a temperature difference between the heat resistor and the temperature-compensating resistor becomes constant, and a change in the current is directly or indirectly sensed, thereby measuring an airflow rate.

In the case where such a thermal airflow meter as described is installed in an internal combustion engine of an automobile, and so forth, heat of the internal combustion engine is transferred from the wall of the intake air passage to the airflow meter due to rise in temperature of the engine. Further, there are times when air temperature undergoes a change while the automobile is running. Further heat generation occurs to part of the airflow meter itself, such as a drive circuit for driving the airflow meter. Such a change in ambient temperature and self-heating cause an error in a sensed flow rate of the airflow meter even if the temperature-compensating resistor is provided.

Conventional thermal airflow meters designed so as to reduce a flow rate sensing error due to such a change in temperature, are disclosed in Japanese Patent Laid-Open No. S61(1986)-239119, and Japanese Patent Laid-Open No. H10(1998)-197309, respectively.

Japanese Patent Laid-Open No. S61(1986)-239119 is described as follows. It is empirically known that if temperature of an air passage body through which air to be measured flows differs from a sensed air temperature, this will cause a airflow rate sensing error. And, the sensing error is corrected in the following manner. That is, a resistor for measuring an air temperature is disposed in an air passage, and a wall-face of the air passage is provided with a temperature-sensing resistor for sensing temperature at the wall face. Thereby an airflow rate signal is corrected on the basis of a difference between the temperature at the wall face of the air passage and the air temperature.

Further, in Japanese Patent Laid-Open No. H10(1998)-197309, it has been disclosed that a sensor for sensing an air temperature and a sensor for sensing a substrate temperature are provided on a substrate having a flow-rate measuring element (a heat resistor and a temperature-compensating resistor). The substrate of the flow-rate measuring element is structured in such way as to be held by a holder attached to the wall of an air passage. The substrate-temperature sensor is provided at one end side of the substrate adjacent to the holder. Meanwhile, the air-temperature sensor is disposed at the other end side of the substrate (opposite to the holder). The substrate-temperature sensor senses rise in the substrate temperature due to heat-transfer from an engine and so forth. The heat of the engine is transferred from the wall of the intake air passage to the substrate of the flow-rate measuring element. On the basis of information on the substrate temperature, and information on the air temperature, a flow rate sensing error is corrected.

In the case of conventional arts described in the foregoing, according to a system in which the wall-face of the air passage is provided with the temperature-sensing, as disclosed in Japanese Patent Laid-Open No. S61(1986)-239119, the temperature at the wall face is sensed by embedding the temperature-detection resistor in the wall of the air passage. With such a configuration as described, however, the temperature-sensing resistor is embedded in resin, so that a molding process of the airflow meter becomes complex. Furthermore, in order to draw out a terminal of the temperature-sensing resistor to the outside of the wall of the air passage, it has been necessary to additionally provide a body of the airflow meter with an external connection terminal for temperature output besides a terminal for an airflow rate signal, and a power input/output terminal.

Meanwhile, in Japanese Patent Laid-Open No. H10(1998)-197309, the substrate-temperature sensor and the air-temperature sensor are provided on the substrate with the flow-rate measuring element (the heat resistor and the temperature-compensating resistor), and obtaining an airflow rate according to a temperature difference between both the sensors. With this system, in the case where a semiconductor substrate made of silicon and so forth is used for the substrate of the flow-rate measuring element, because a silicon substrate has a high thermal conductivity among substrate materials, there occurs little difference between the one end of the substrate (adjacent to the holder) and the other end of the substrate (opposite to the holder). Accordingly, the information on the substrate temperature, and the information on the air temperature come to indicate nearly an identical temperature all the time. So, it is impossible to satisfactorily sense heat transferred to the substrate from outside such as the engine and so forth, and the airflow meter has a matter to be improved in respect of correction accuracy.

Furthermore, because heat from outside such as the holder and so forth is transferred to the flow-rate measuring element in whole, the air temperature information obtained from the intake air-temperature sensor had a tendency of indicating temperature higher than an actual air temperature.

DISCLOSURE OF THE INVENTION

An object of the invention is to enhance flow-rate measurement accuracy by resolving above-described problems in the conventional arts and to enhance accuracy with respect to an air temperature sensing.

The invention has a basic configuration as follows.

A flow-rate measuring element comprises a heat resistor and a temperature-compensating resistor which are formed on a substrate (first base member). The flow-rate measuring element is held by a casing housing a drive circuit of a thermal airflow meter, and is disposed in an air passage for air to be sensed as airflow-rate via the casing. The thermal airflow meter further comprises first and second temperature sensors for measuring temperature at each of two points in the thermal airflow meter, respectively. And the first temperature sensor is provided on the substrate (the first base member) of the flow-rate measuring element while the second temperature sensor is provided inside the casing. The second temperature sensor is preferably disposed on the circuit board (a second base member with, for example, the drive circuit of the thermal airflow meter, and a signal processor, mounted thereon) housed in the casing.

With such a configuration as described above, it becomes possible for the signal processor to compute an airflow rate corrected for external thermal effects, on the basis of three pieces of information including an output signal from the flow-rate measuring element, and output signals from the first and second temperature sensors, respectively (specific examples of such computations will be described in description of embodiments of the invention).

Consequently, in spite of a structure in which the flow-rate measuring element is held by other constituent members, it becomes possible to correct for a flow rate sensing error due to heat-transfer from outside, and to sense a highly accurate airflow rate.

Further, because the first and second temperature sensors are provided on the first and second base members, respectively, so as to be separated from each other, a temperature difference between two points in the thermal airflow meter can be definitely taken out, thereby enabling to enhance accuracy in computation of an airflow rate. Further, by electrically connecting the first and second base members with each other, and by processing at least one of the airflow rate, an air temperature, an air passage wall face temperature, and so forth at the second base member, the signals from the temperature sensors, and so forth can be internally processed in the thermal airflow meter. Accordingly, there is no need for additionally installing output terminals of the temperature sensors, serving as connecting terminals of equipment outside the airflow meter. Furthermore, since a structure where the temperature sensors are embedded in a wall face of the airflow meter as in the conventional case is not adopted, the temperature sensors can be installed with greater ease.

BEST MODE FOR CARRYING OUT THE INVENTION

An embodiment of the invention is described hereinafter with reference to the accompanying drawings.

Figure 1:
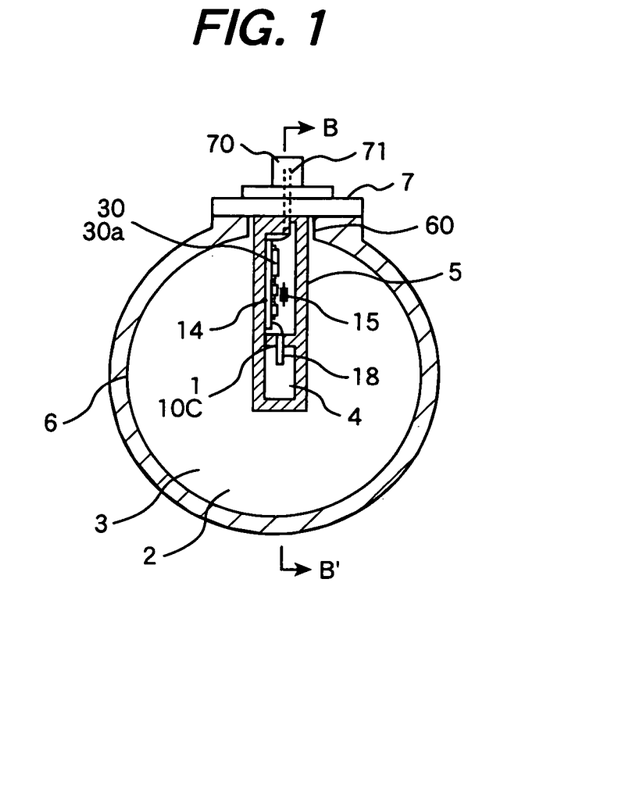
FIG. 1 is a cross-sectional view of one embodiment of a thermal airflow meter according to the invention, perpendicular to an air passage thereof.
Figure 2:
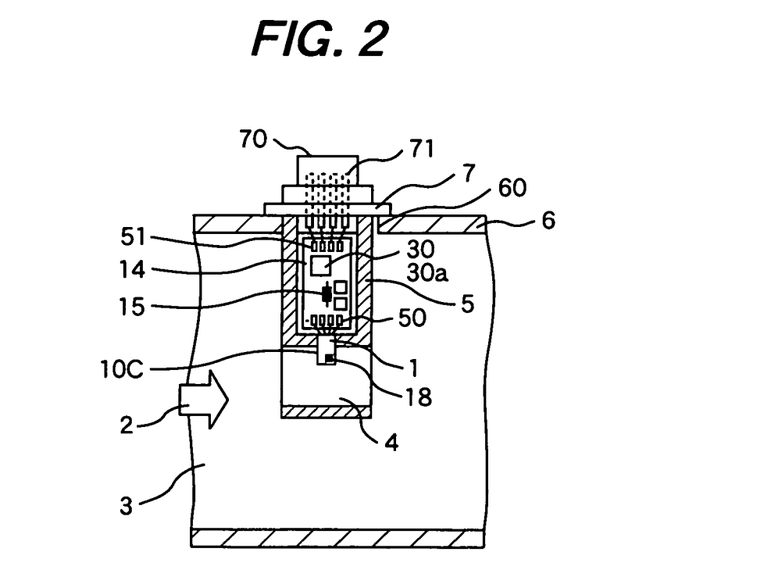
FIG. 2 is a sectional view taken on line B-B' of FIG. 1.
Figure 3:
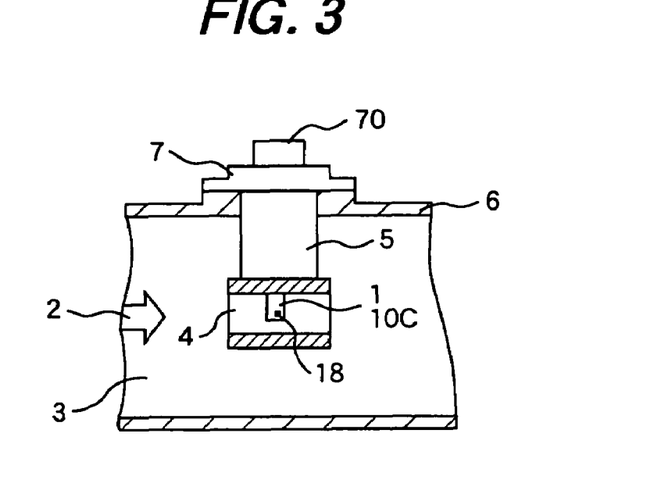
FIG. 3 is a sectional view similar to FIG. 2, showing an outward appearance of a casing of the thermal airflow meter.
Figure 4:
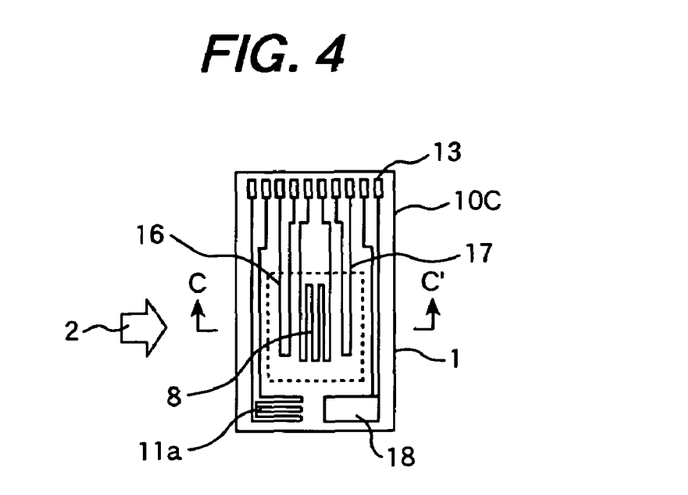
FIG. 4 is a plan view of a flow-rate measuring element used in the embodiment described.

FIG. 1 is a cross-sectional view of one embodiment of a thermal airflow meter according to the invention, the cross-sectional view being perpendicular to the axis of an air passage thereof, FIG. 2 is a sectional view taken on line B-B' of FIG. 1, and FIG. 3 a sectional view similar to FIG. 2, showing an outward appearance of a casing of the thermal airflow meter. FIG. 4 is a plan view of a flow-rate measuring element (hereinafter referred to merely as a measuring element) 1, and FIG. 5 a sectional view taken on line C-C' of FIG. 4.

In FIGS. 1 to 3, the airflow meter comprises the measuring element 1, a secondary passage (a measurement passage) 4 where the measuring element 1 is disposed, a circuit board (second base member) 14, a casing 5 with the circuit board 14 housed therein, a holder 7 for supporting the casing 5, a connector 70, and so forth. The measuring element 1 is configured by forming a heat resistor, a temperature-compensating resistor, and so forth, on a substrate (first base member) 10c, as described later on. The secondary passage 4, the casing 5, the holder 7, and connector 70 are formed integrally with each other by use of a synthetic resin.

An intake air passage (a main passage) 3 through which air to be measured flows constitutes a part of an intake pipe. The intake pipe is used for feeding intake air into an internal combustion engine. The airflow meter is provided at a cylindrical body (body) 6 forming the intake air passage 3 in the following manner.

The body 6 has an airflow-meter installation hole 60, and the secondary passage 4 and the casing 5 are inserted into the body 6 through the installation hole 60. The holder 7 in a flange-like shape is fixed on an external surface of an air passage wall face (the body) 6 with a screw, and so forth.

Thus, the secondary passage 4 and the casing 5 are sequentially disposed inside the body 6 so as to extend from a wall face of the intake air passage 3 toward the center thereof in the radial direction of the body 6. The secondary passage 4 is supported by one end of the casing 5 to be thereby disposed substantially at the center of the intake air passage 3, in the transverse direction thereof.

Figure 5:
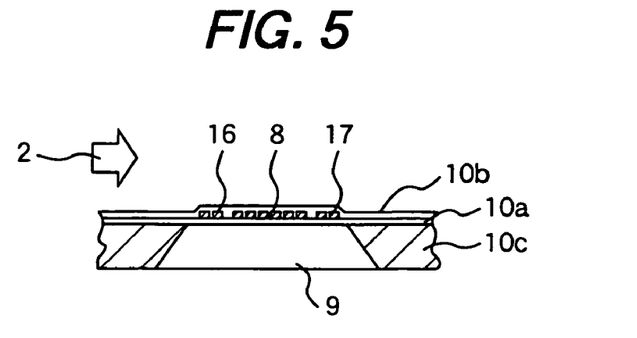
FIG. 5 is a sectional view taken on line C-C' of FIG. 4.

Herein, the measuring element 1 is described in detail with reference to FIGS. 4 and 5.

With the present embodiment, a substrate (a first base member) 10c of the measuring element 1 is formed of a semiconductor such as silicon, and so forth. The heat resistor 8, an upstream resistor 16 being disposed immediate upstream from the heat resistor in the direction of intake airflow, a downstream resistor 17 being disposed immediate downstream from the heat resistor, the temperature-compensating resistor 11a, and a first temperature sensor 18a are formed on the substrate 10c. The first temperature sensor 18a is used for sensing temperature on the periphery of the measuring element, in other words, over the substrate 10c. Those elements are all formed of a polysilicon (or may be formed of platinum or whatever a constituent material thereof may be) over the substrate 10c with an electrically insulating film 10a interposed therebetween. The first temperature sensor 18 may be made of a semiconductor element such as a thermistor, and so forth.

By anisotropic etching process, a cavity 9 is formed in a part of the back surface of the substrate 10c made of silicon, the spot for the cavity to be formed is corresponding to a spot where the heat resistor 8, the upstream resistor 16, and the downstream resistor 17 on the front surface of the substrate. The cavity 9 is formed so as to reach a lower surface of the electrically insulating film 10a from the underside of the substrate 10c. The heat resistor 8, the upstream resistor 16, and the downstream resistor 17 are located on the front surface of the electrically insulating film 10a-spot corresponding to the cavity 9. Those resistors have temperature dependence where the resistance characteristics vary in response to temperature changes. Further, for protection of those resistors and the temperature sensor, an electrically insulating film 10b is formed in the uppermost layer of the substrate 10c.

The temperature-compensating resistor 11a senses air temperature to thereby provide compensation for temperature so that a difference between temperature of the heat resistor 8 and the air temperature (the temperature of the temperature-compensating resistor) becomes substantially constant. The temperature-compensating resistor 11a and the first temperature sensor 18 are formed on the electrically insulating film 10a and adjacent to one extremity of the substrate 10c (an opposite side to the position supporting the measuring element 1).

The measuring element 1 (the first base member 10c) is held with the casing 5 at one end of the casing 5 as shown in FIG. 2. Respective terminal electrodes 13 of those resistors 8, 16, 17, 11a, and the first temperature sensor 18 are disposed on the substrate 10c in the vicinity of one end of the substrate and on the supported side (adjacent to the casing). The respective terminal electrodes 13 are electrically connected by wire bonding to respective terminal electrodes 50 of an external circuit (the circuit board 14 inside the casing 5) of the measuring element 1.

If the first temperature sensor 18 is a semiconductor element such as a thermistor, and so forth, the first temperature sensor 18 may be electrically connected to the external circuit by welding.

Figure 6:
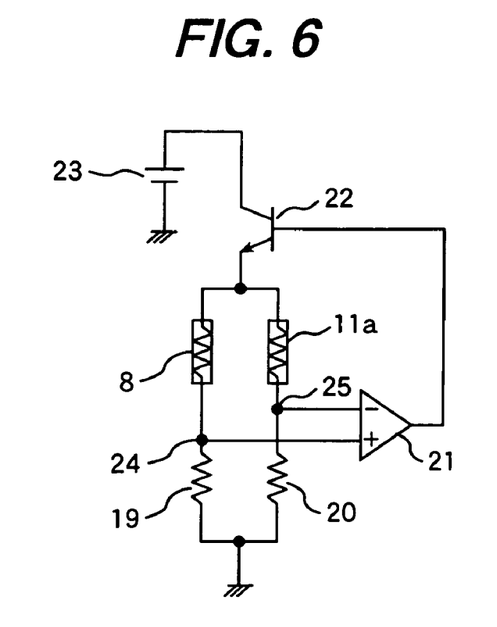
FIG. 6 is a view showing a drive circuit of the thermal airflow meter according to the embodiment.

Now, the circuit board (the second base member) 14 inside the casing 5 is described. The circuit board 14 has a drive circuit (a circuit for controlling a heating current of the heat resistor 8, that is, for example, a circuit comprised of bridge element resistors 19, 20, an op-amp 21, and a transistor 22, as shown in FIG. 6) of the air flow meter, and a signal processor 30.

The signal processor 30 has elements (for example, a signal output line 33 in FIG. 7) of an airflow rate sensing circuit, a computing unit 31 (FIG. 8) for executing corrective operation for an airflow rate, and so forth, and a memory 32 for storing flow-rate correction data.

Further, the circuit board 14 is provided with a second temperature sensor 15 for sensing temperature (an intra-casing temperature) on the circuit board. The second temperature sensor 15 is made up of a semiconductor element such as, for example, a thermistor. Since the first temperature sensor 18 and the second temperature sensor 15 are provided for measuring temperature at each of two points of the airflow meter, respectively, those temperature sensors are preferably identical substantially in characteristics thereof.

The present embodiment can be structured such that the circuit board (second base member) 14 and the measuring element substrate (first base member) 10c are provided so as to be separated from each other in the radial direction of the intake air passage 3, and the first temperature sensor 18 and the second temperature sensor 15, for use in measuring the temperatures at each of the two points, respectively, are individually disposed on the respective substrates. The first and second base members are then sequentially disposed via electrical connection. A flow-rate measuring signal (a sensed airflow rate) Qm, and output signals T1, T2 of the first and second sensors, respectively, are inputted to the signal processor 30 of the second base member 14 via an A/D converter (refer to FIG. 8). On the basis of those signals, an intake air temperature (air temperature) Ta and an intake air passage wall face temperature Tw are computed presumptively, and corrective operation for an airflow rate is further executed (a post-correction airflow rate: Q'm). A specific example of such operations will be described later on.

Terminal electrodes 51, which are connected with connector terminals 71 for external connection via wire bonding, are disposed on the circuit board (the second base member) 14 in the vicinity of one end of the circuit board, on the opposite side to the measuring element 1. The connector terminals 71 comprise a power supply terminal of the airflow meter, and terminals for outputting the above-described signals Ta, Tw, Q'm respectively. The connector terminals 71 are respectively connected to an extra-airflow-meter battery 23 (FIGS. 6, 7), and an engine control unit (not shown). Airflow rate data Q'm is used by the engine control unit as computation data for a fuel injection quantity while the air temperature Ta and the wall face temperature Tw can be used for other applications.

It is a low-cost method to mount the second temperature sensor 15 integrally on the circuit board 14 provided with the drive circuit, and so forth. If a computing unit with a temperature sensor provided therein beforehand is used as a circuit on the board 14, the temperature sensor of the computing unit may be used as the second temperature sensor. In such a case, there is no need for constituent members such as wiring, and so forth, thereby leading to further reduction in cost.

Next, there is described hereinafter the operation principle of the airflow meter according to the present embodiment.

The heat resistor 8 and the temperature-compensating resistor 11a, shown in FIG. 4, serve as elements of a bridge circuit shown in FIG. 6. The temperature-compensating resistor 11a is sensitive to air temperature and thereby varies the resistance value thereof. A current flowing through the heat resistor 8 is controlled by using the temperature-compensating resistor 11a so that temperature of the heat resistor 8 becomes higher than temperature of air 2 by a predetermined temperature.

The bridge circuit comprises the heat resistor 8, the temperature-compensating resistor 11a, and the resistors with fixed resistance 19, 20. A drive circuit for driving the bridge circuit comprises the op-amp 21, and the transistor 22. The bridge circuit is electrically connected to the battery 23 via the drive circuit. The battery serves as a power supply source for the drive circuit.

The heat resistor 8 and the temperature-compensating resistor 11a are a polysilicon resistor large in temperature coefficient at zeroth order of the resistance. A potential difference between bridge voltages 24, 25 is fed back to the bridge circuit via the op-amp 21 and the transistor 22, thereby rendering a bridging resistance ratio constant all the time.

By increasing an initial resistance value of the temperature-compensating resistor 11a, and by decreasing an initial resistance value of the heat resistor 8 to the contrary, the temperature-compensating resistor 11a has a smaller heat generating value. Accordingly, the temperature of the temperature-compensating resistor 11a is substantially equal to that of air 2 to be measured as airflow rate. On the other hand, the heat resistor 8 has a smaller initial resistance value in order to allow a heating current to flow therethrough. Further, the back surface of the heat resistor 8 is thermally insulated by means of the cavity 9 as shown in FIG. 5, so that a resistance value thereof can increase upon rise in temperature thereof due to heat generation. Accordingly, it follows that the resistance value of the heat resistor 8 continues to rise until a resistance ratio among the bridge element resistors 8, 11a, 19, 20 becomes a predetermined value. Thereby it is possible to control the heat resistor 8 so that the temperature of the heat resistor 8 becomes higher than that of the temperature-compensating resistor 11a, namely than the temperature of air 2 by a predetermined temperature.

Figure 7:
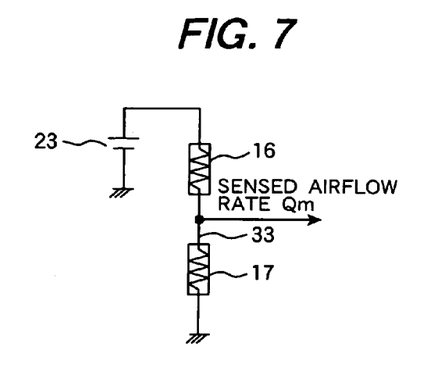
FIG. 7 is a view showing a flow rate detection circuit of the thermal airflow meter according to the embodiment.

FIG. 7 shows a circuit for sensing air flow rate of the target air 2. As shown in FIG. 4, the air 2 flows onto the measuring element 1. At this point in time, since an upstream resistor 16, and the down stream resistor 17 are disposed upstream and downstream from the heat resistor 8, respectively, the temperature of the upstream resistor 16 is reduced by a stream of the air 2 while the temperature of the resistor 17 is increased due to influx of the air warmed by the heat resistor 8. Consequently, those two resistors undergo respective changes in resistance value due to a change in temperature.

Accordingly, by electrically connecting the upstream resistor 16 to the downstream resistor 17 as shown in the flow rate sensing circuit of FIG. 6, it is possible to obtain a voltage signal Qm corresponding to the temperature difference namely an airflow rate.

Figure 8:
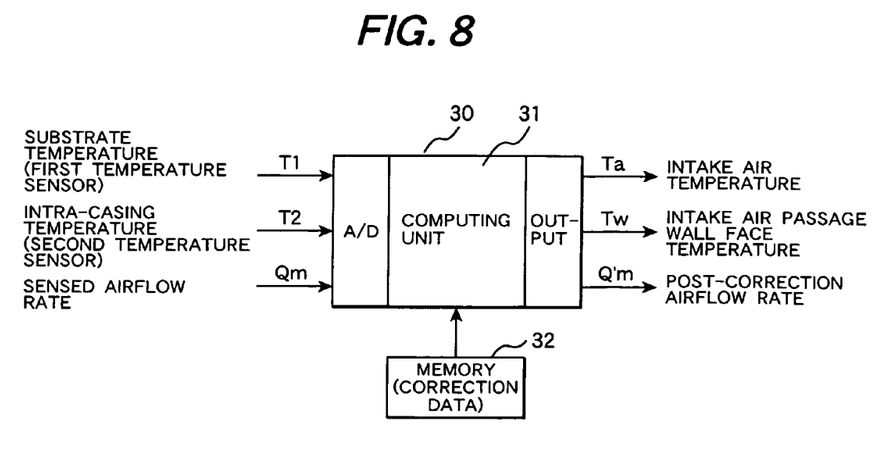
FIG. 8 is a block diagram of a signal processor used in the embodiment.

As shown in FIG. 8, the substrate temperature (measuring element temperature) T1 from the first temperature sensor 18, the intra-casing temperature T2 from the second temperature sensor 15, and the sensed airflow rate Qm from the flow rate sensing circuit 33 are inputted to the computing unit 31 (the signal processor 30) mounted on the circuit board 14 (FIGS. 1 and 2).

Those input signals (information) are converted from analog signals to digital signals for processing by the computing unit 31, and the intake air temperature Ta, the intake air passage wall face temperature Tw, and the post-correction airflow rate Q'm are computed with high precision. Those computed signals are outputted to an extra-airflow meter device via an output port. A specific example of the processing will be described later on.

Although the present embodiment adopts a configuration that the airflow rate Q'm, the intake air temperature (temperature of air to be sensed as airflow rate) Ta, and the intake air passage wall face temperature Tw are outputted, it is possible to adopt a configuration wherein only the airflow rate signal or any signal selected from the group of those computed signals is outputted.

In the case of applying the conventional airflow meter to an internal combustion engine of an automobile, and so forth, the following problems have been encountered:

(1) a flow rate sensing error due to temperature-changes of air to be measured as airflow rate;
(2) a flow rate sensing error due to rise in temperature of the engine, caused by heat transfer to the intake air passage from the internal combustion engine, that is to say, a flow rate sensing error occurring when temperature of the intake air passage wall face 6 in FIGS. 1 and 2 differs from the temperature of air 2;
(3) an airflow rate is affected by rise in the temperature of air or the airflow meter itself, that is, heat generation occurring to drive/sensing circuits, and so forth.

An object of the present invention is to execute an airflow rate measurement with high precision without being affected by such changes in temperature as described, and detailed explanation is given hereinafter.

Figure 9:
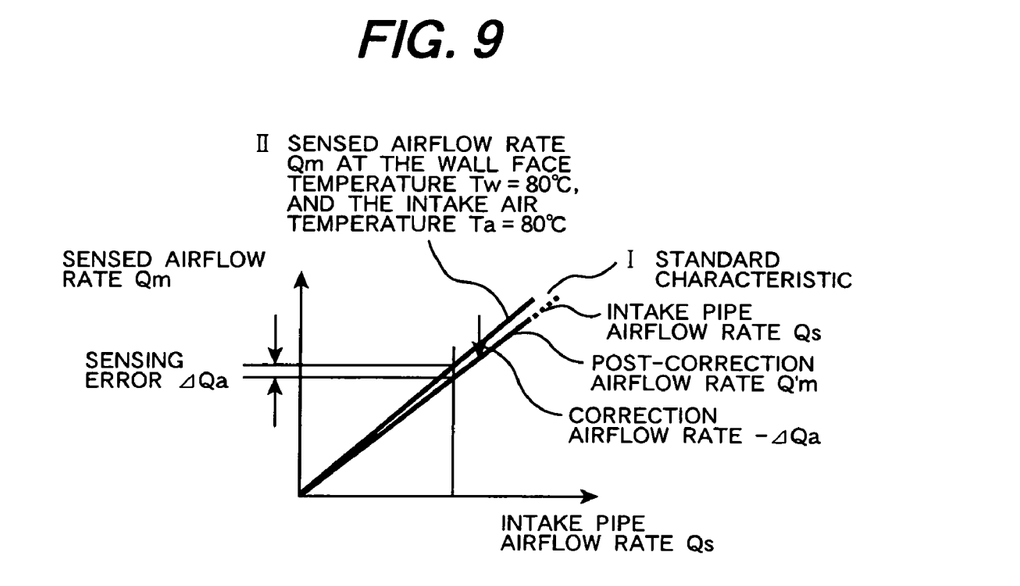
FIG. 9 is a diagram showing flow-rate correction at the time of a change in an intake air temperature in the case of the embodiment described.
Figure 10:
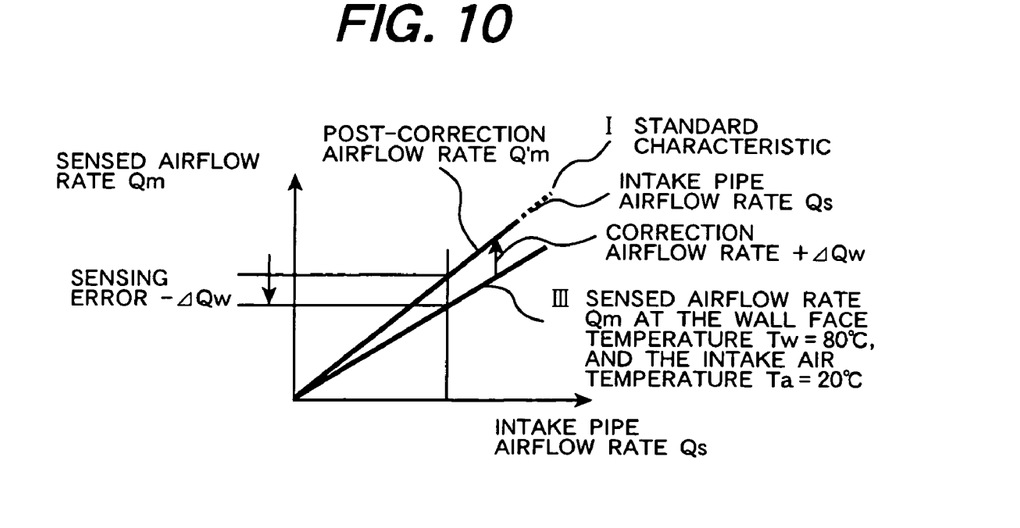
FIG. 10 is a diagram showing flow-rate correction at the time of a change in an intake air passage wall face temperature in the case of the embodiment described.

FIGS. 9 and 10 show an example of a sensing flow rate error occurring when temperature of a detection-target air 2 and intake pipe wall face temperature undergo a change in a conventional thermal airflow meter (an airflow meter of a type without two temperature sensors provided at two points).

In FIGS. 9 and 10, a characteristic I indicates a proper sensed airflow rate signal Qm—intake pipe airflow rate Qs characteristic (standard characteristic). The standard characteristic I is the Qm–Qs characteristic at a time when, for example, the wall face temperature Tw is 20° C. and an intake air temperature is 20° C.

In the case where the wall face temperature Tw, and the intake air temperature Ta undergo an abrupt change from normal temperatures due to an automobile driving environment undergoing a considerable change, the temperature-compensating resistor 11a is no longer capable of properly coping with such a change, resulting in occurrence of a flow rate sensing error.

For example, a characteristic II in FIG. 9 indicates test data on the case where both the intake air temperature and the wall face temperature rise from +20° C. to +80° C., and in this case, a plus error +ΔQa tends to occur to an airflow rate sensed by the conventional airflow meter for a whole airflow rate range. Conversely, if both the wall face temperature and the intake air temperature fall from +20° C. to −20° C. (not shown), a minus error tends to occur to the airflow rate.

A characteristic III in FIG. 10 indicates the Qm–Qs characteristic in the case where temperature at an intake air passage wall face 6 rises from +20° C. to +80° C. due to heat of an internal combustion engine and so forth, while the air 2 is at +20° C.

Thus, if a temperature difference of 60° C. occurs between the intake air temperature and the intake air passage wall face temperature even though the intake air temperature is an normal temperature, a minus error as −Δ Qw tends to occur to the airflow rate sensed by the airflow meter for the whole airflow rate range. A temperature distribution state of the airflow meter, at that point in time, is shown in FIG. 11.

Figure 11:
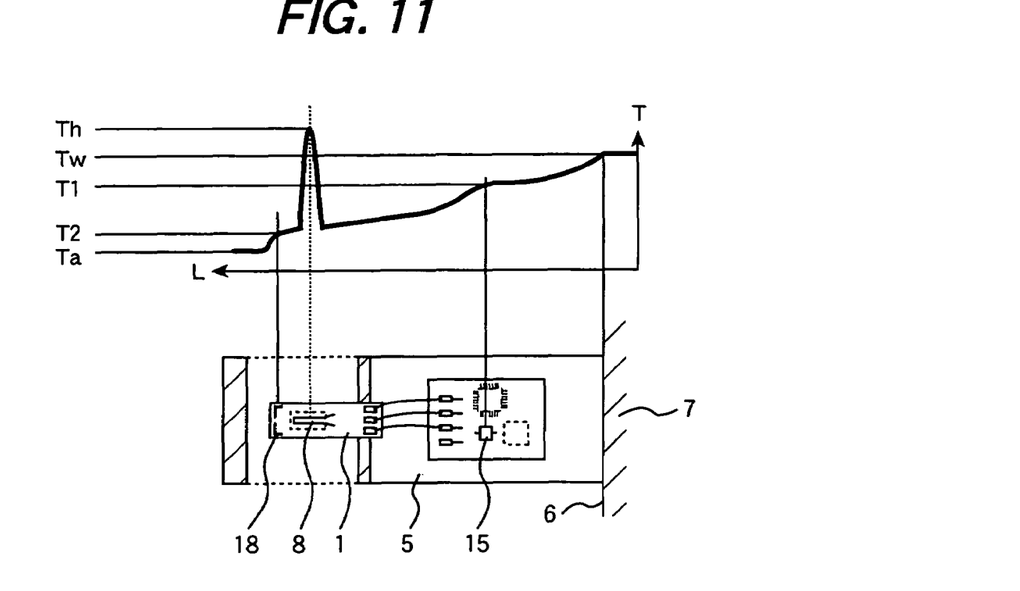
FIG. 11 is a view showing temperature distribution of the thermal airflow meter according to the embodiment.

In the case where the temperature Tw at the holder 7 (positioned on the intake air passage wall face) of the thermal airflow meter is +80° C., and the intake air temperature Ta (temperature of intake air 2) is +20° C. in FIG. 11, temperature distribution between the holder 7 and the measuring element 1 comes to have a gradient shown in FIG. 11. If the temperature Tw at the holder 7 and the intake air temperature Ta are only taken in consideration, temperature gradually falls from the holder 7 toward the measuring element 1.

However, in the case where the drive/sensing circuits etc. of the airflow meter are installed inside the casing 5 like the present embodiment, the intra-casing 5 temperature rises due to heat generation from the circuits. Furthermore, since the heat resistor 8 is provided on the measuring element 1, a localized temperature rise Th occurs over the measuring element 1. In such a state, an error factor occurs to respective parts of the airflow meter, so that an error occurs to the sensed flow rate of the airflow meter. Furthermore, and such various heats are transferred to the measuring element 1, thereby exerting an influence on a sensed temperature of the first temperature sensor 18 on the measuring element 1.

An object of the invention is to remove the influence, and the object can be achieved by utilizing three pieces of information including information Qm on the airflow rate of the intake air 2, the measuring element temperature T2, and the intra-casing temperature T1.

That is, the three pieces of information include the airflow rate signal Qm from the measuring element 1 shown in FIGS. 1, 2, and 11, the temperature information T1 from the first temperature sensor 18 provided on the measuring element 1, and the temperature information T2 from the second temperature sensor 15 installed inside the casing.

Using the above-described three pieces of information, it is possible to estimate highly accurate airflow rate information Q'm, the intake air temperature Ta, and the intake air passage wall face temperature Tw by an operation with the use of a temperature distribution model of the thermal airflow meter as described hereinafter.

First, a method for computing the intake air temperature, and the intake air passage wall face temperature is described hereinafter.

Figure 12:
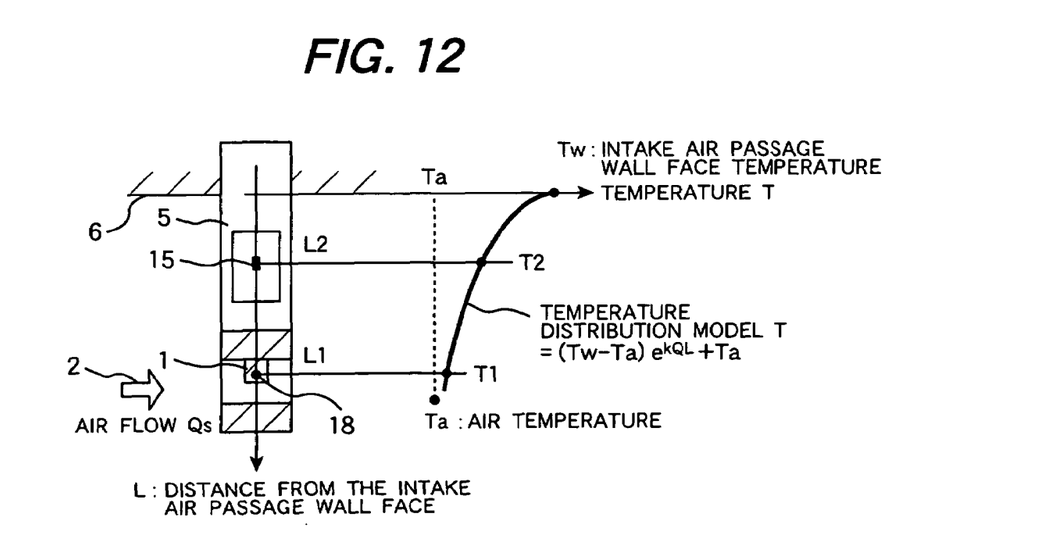
FIG. 12 is a view showing a temperature distribution model of the thermal airflow meter according to the embodiment.

FIG. 12 shows a simple temperature distribution model used in the method for computing the intake air temperature Ta, and the intake air passage wall face temperature Tw.

Assuming that the longitudinal direction of the casing 5 of the airflow meter (the radial direction of the intake air passage) is designated as L, temperature along the longitudinal direction L as T, temperature of the intake air passage wall face supporting the casing 5 as Tw, the intake air temperature as Ta, and the intake airflow rate as Qs, in FIG. 12, a temperature distribution state in the longitudinal direction L can be obtained by approximation with an exponential function represented by the following expression:

$$T = (Tw - Ta)\exp(k \cdot Qs \cdot L) + Ta \quad (1)$$

Then, assuming that the position of the first temperature sensor 18 on the measuring element 1 is L1, and the position of the second temperature sensor 15 installed inside the casing 5 is L2, relative to the intake air passage wall face 6, the respective sensed temperatures T1, T2 are obtained by the respective temperature sensors. Further, Qs in the expression (1) is assumed to be the airflow rate Qm sensed from the measuring element 1, and in estimating the intake air temperature Ta and the intake air passage wall face temperature Tw, it is assumed that Qm=Qs.

Herein, a constant k is an adjustment parameter for matching a virtual temperature distribution model with a realistic temperature distribution obtained on the basis of experimental values. By substituting those values of L1, L2, and T1, T2 for L and T in the above expression (1), respectively, the following simultaneous equations hold:

$$T1 = (Tw - Ta)\exp(k \cdot Qm \cdot L1) + Ta \quad (2)$$

$$T2 = (Tw - Ta)\exp(k \cdot Qm \cdot L2) + Ta \quad (2)$$

Here, T1 represents the temperature information from the first temperature sensor 18, T2 represents the temperature information from the second temperature sensor 15, and Qm represents the sensed airflow rate from the measuring element 1. Since k is the constant, and L1, L2 are constants dependent on an implemented structure, respectively, Tw and Ta are unknowns, so that the temperature Tw of the intake air passage wall face 6, and the temperature Ta of the intake air 2 are found by solving the simultaneous equations for Tw and Ta.

Such an operation as described above is executed by the intra-casing computing unit 31 (the signal processor 30).

If the temperature Ta of the intake air 2, and the temperature at the holder 7 of the airflow meter, that is, the intake air passage wall face temperature Tw are obtained, it is possible to correct the sensed airflow rate Qm obtained from the measuring element 1 and the airflow rate sensing circuit (FIG. 7).

Figure 13:
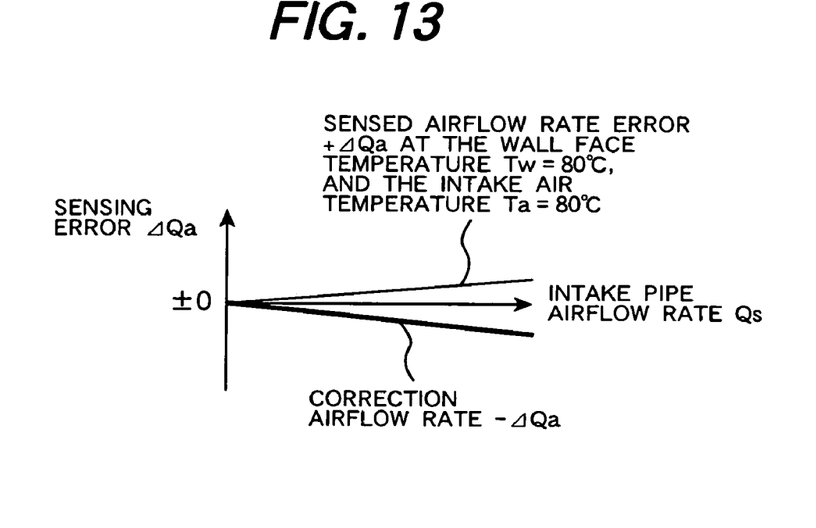
FIG. 13 is a diagram showing a correction airflow rate value at the time of a change in the intake air temperature in the case of the embodiment described.
Figure 14:
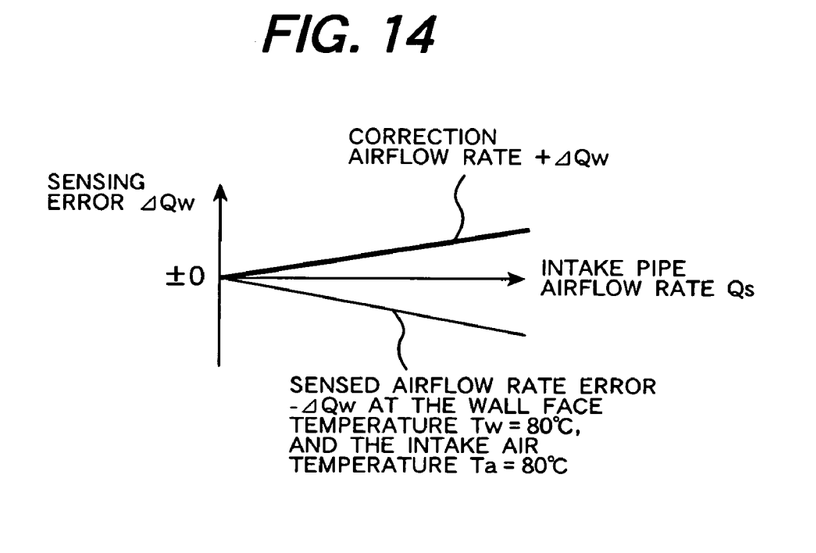
FIG. 14 is a diagram showing a correction airflow rate value at the time of a change in the intake air passage wall face temperature in the case of the embodiment described.

More specifically, if the temperature at the intake air passage wall face 6 rises, a correction airflow rate +Δ Qw corresponding to a airflow error occurring due to such an event is given inside the computing unit 31, as shown in FIGS. 10 and 14. In addition, if the intake air temperature undergoes a change, a correction airflow rate —ΔQa concerning such a change in the intake air temperature is similarly given, as shown in FIGS. 9 and 13, thereby enabling highly accurate airflow rate information Q'm to be sensed.

In the present embodiment, the computing unit 31 has the memory 32 therein, storing maps and functions for finding a correction airflow rate value corresponding to the intake air temperature Ta, the intake air passage wall face temperature Tw, and the sensed airflow rate Qm, as the correction data.

For example, in the case of the memory 32 storing a map for airflow correction data α1 corresponding to the intake air temperature Ta, and airflow correction data α2 corresponding to the intake air passage wall face temperature Tw, the post-correction airflow rate Q'm is obtained by the following expression:

$$Q'm = Qm \times \alpha 1(Ta) \times \alpha 2(Tw) \quad (3)$$

By execution of computation of the post-correction airflow rate on the basis of those inputs, and the correction data, it is possible to implement sensing of a highly accurate airflow rate.

Further, with the present embodiment, the respective temperatures at the two points of the airflow meter can be sensed on the respective substrate and circuit board independent from each other, in a heat transferring passage from the wall face of the airflow meter to the intake air passage. Therefore, reliability of respective temperature data can be enhanced. Further, the computation of the post-correction airflow rate based on the respective temperatures at the two points and the airflow rate sensing signal, and computation of the air temperature, the wall face temperature, and so forth are all processed inside the casing of the airflow meter. So, In connector terminals of the airflow meter to external devise, it is unnecessary to provide terminals of the temperature sensors, thereby enabling simplification of output terminals, and wiring harness to be implemented. Furthermore, since those temperature sensors are provided respectively on the substrate of the flow-rate measuring element and the intra-casing circuit board, it is unnecessary that the housing of the airflow meter itself has an structure for installation of the temperature sensors, thereby enabling simplification of the flow meter housing structure to be implemented.

Still further, with the present embodiment, although the second temperature sensor 15 is provided on the circuit board 14, it can be mounted inside the casing 5 so as to be separated from the circuit board 14.

Further, for the flow-rate measuring element 1, use may be made of a type of flow-rate measuring element with film-type thermal-sensitive resistors (the heat resistor, the temperature-compensating resistor) provided on an insulating substrate.

Figure 15:
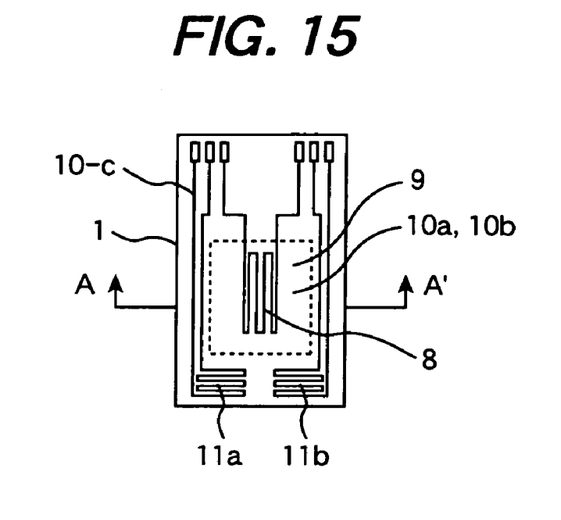
FIG. 15 is a plan view showing another example of the measuring element used in the embodiment described.
Figure 16:
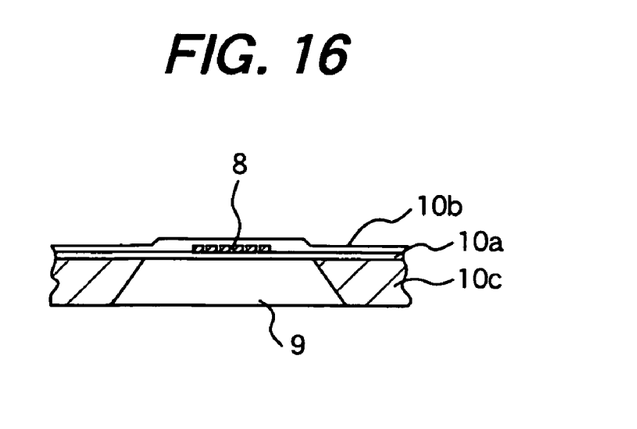
FIG. 16 is a sectional view taken on line A-A' of FIG. 15.
Figure 17:
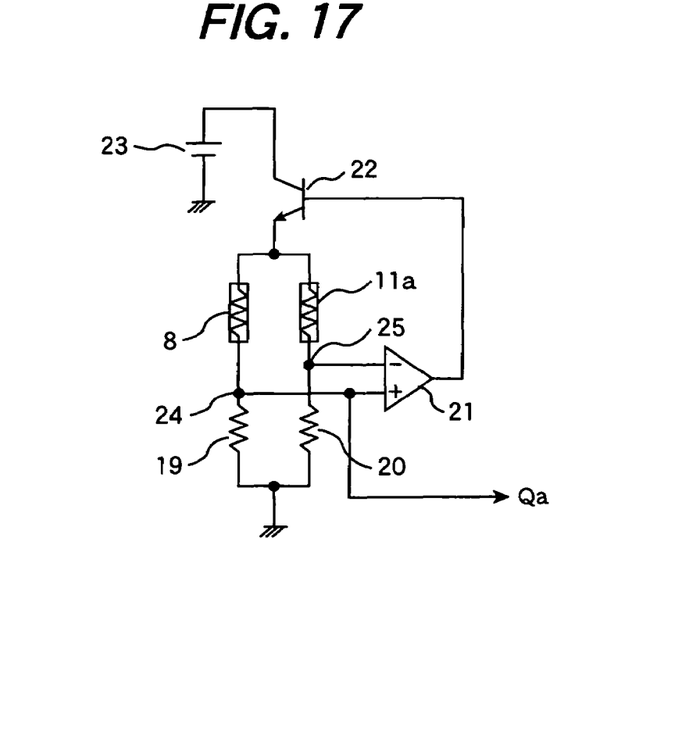
FIG. 17 is a view showing a drive circuit of the thermal airflow meter with the flow-rate measuring element assembled therein.

Furthermore, although, in the embodiment, the flow-rate measuring element 1 indirectly senses the heating current of the heat resistor 8 for sensing the airflow rate by obtaining a temperature difference (resistance value difference) between the upstream resistor and the downstream resistor, however, the flow-rate measuring element 1 is not limited thereto. The flow-rate measuring element may be adopted the sensing type in which the airflow rate is directly sensed from a sensed current value of the heat resistor 8. FIGS. 15, and 16 show an example of the sensing type of flow-rate measuring element for directly obtaining the airflow rate from the sensed heating current. In FIGS. 15, and 16, reference numerals identical to those used in the previously-described embodiment denote identical or common elements. In FIGS. 15, and 16, the upstream resistor and the downstream resistor are not adopted, and as shown in FIG. 17, in a bridge circuit comprising a heat resistor 8, a temperature-compensating resistor 11a, and the fixed-resistance resistors 19, 20, an airflow rate signal Qa is obtained from a voltage at an intermediate point between the heat resistor 8 and the resistor 19.

The signal processor 30 according to the embodiment described in the foregoing can also be provided outside the airflow meter so as to be separated from the drive circuit.

Further, with the embodiment described in the foregoing, an element 18 for dedicated use is adopted as the first temperature sensor for sensing the temperature Ta on the measuring element 1, however, in the case where the temperature-compensating resistor 11a has accuracy matching accuracy required of the first temperature sensor, it is possible to cause the temperature-compensating resistor 11a to have a function for doubling as the first temperature sensor in place of the first temperature sensor 18 for dedicated use.

Figure 18:
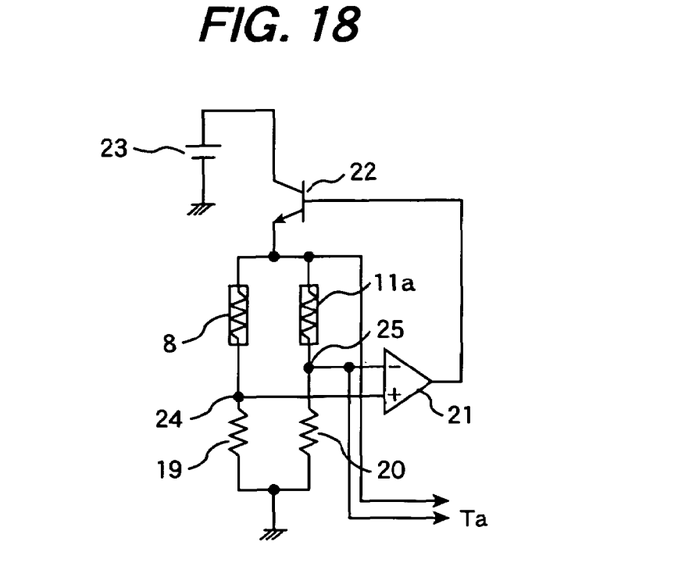
FIG. 18 is a view showing another drive circuit of the thermal airflow meter according to the embodiment.

In FIG. 18, an example of a drive circuit in such a case is shown. The drive circuit according to the example is basically the same as that shown in FIG. 6, but differ from the one of FIG. 6 in that resistance value of the temperature-compensating resistor 11a is taken out from voltage across respective ends of the temperature-compensating resistor 11a, and a signal value of the voltage is taken out as the air temperature (temperature on the measuring element 1) Ta. The signal corresponding to Ta is inputted to the signal processor 30.

INDUSTRIAL APPLICABILITY

With the airflow meter according to the invention, installed in a severe temperature environment such as, for example, in an internal combustion engine, it is possible to correct a flow rate sensing error due to rise in an intake air temperature, and rise in temperature of an intake air passage wall face on which the airflow meter is installed, and to enhance a sensing accuracy. In addition, with a simplified structure eliminating the necessity of embedding the temperature sensors and the terminals thereof in the body of the airflow meter, enhancement of the sensing accuracy can be implemented.

The invention claimed is:

1. A thermal airflow meter comprising:
a flow-rate measuring element which includes a heat resistor and a temperature-compensating resistor, for use in measuring an airflow rate, provided on a substrate thereof; and a casing for holding the flow-rate measuring element and housing at least a drive circuit of the flow-rate measuring element, wherein the flow-rate measuring element is disposed in an air passage for airflow rate measurement with the casing, said thermal airflow meter further comprising:
a first temperature sensor and a second temperature sensor for measuring temperature at each of two points in the thermal airflow meter, respectively,
wherein the first temperature sensor is provided on the substrate of the flow-rate measuring element, and the second temperature sensor is provided inside the casing.

2. The thermal airflow meter according to claim 1, wherein the flow-rate measuring element is a semiconductor element being provided with the heat resistor and the temperature-compensating resistor which are formed by patterning on a semiconductor substrate,
a circuit board with at least the drive circuit formed thereon is housed in the casing,
the first temperature sensor is provided over the semiconductor substrate of the flow-rate measuring element, and the second temperature sensor is provided over the circuit board inside the casing.

3. The thermal airflow meter according to claim 1, wherein the second temperature sensor is provided on a circuit board disposed inside the casing, the substrate having the first temperature sensor is electrically connected to a circuit board having the second temperature sensor via terminal electrodes, the circuit board is provided with a signal processor for receiving an output signal of the flow-rate measuring element and respective output signals of the first and second sensors, and computing an airflow rate on the basis of those signals.

4. The thermal airflow meter according to claim 3, wherein the circuit board is provided with a memory for storing correction data for use in airflow rate computation by the signal processor.

5. The thermal airflow meter according to claim 3, wherein the signal processor estimates an air temperature and an intake air passage wall face temperature on the basis of the respective output signals of the first and second sensors and the output signal of the flow-rate measuring element, and obtains correction data for airflow rates from the estimated air temperature and intake air passage wall face temperature, and computes an airflow rate by use of the correction data.

6. The thermal airflow meter according to claim 1, wherein the airflow meter has a secondary passage for allowing a portion of air flowing through a main air passage to pass, the secondary passage is held by the casing, and the secondary passage and the casing are inserted through the wall of the main air passage in the radial direction of the air passage to be disposed inside the main air passage;
the substrate of the flow-rate measuring element being positioned in the secondary passage, and the first temperature sensor being provided over the substrate of the flow-rate measuring element;
a circuit board with the drive circuit of the flow-rate measuring element, a signal processor and the second temperature sensor, being housed in the casing.

7. A thermal airflow meter comprising:

a first base member being disposed in an air passage, and having a heat resistor for airflow rate-measurement and a temperature-compensating resistor;

a second base member having a circuit for driving the heat resistor and the temperature-compensating resistor, and a signal processor for computing an airflow rate;

wherein the first base member and the second base member are sequentially disposed in the radial direction of the air passage via electrical connection, and the second base member is housed in a casing which is inserted into the air passage through the wall of the air passage, while the first base member is held at one extremity of the casing, and said thermal airflow meter further comprising:

a first temperature sensor and a second temperature sensor for measuring temperature at each of two points in the thermal airflow meter, respectively, provided on the first and second base members, wherein a flow-rate measuring signal and respective output signals of the first and second sensors are inputted to the signal processor of the second base member, and the airflow rate is computed on the second base member on the basis of those signals.

8. A thermal airflow meter for measuring a flow rate of air flowing through an intake air passage of an internal combustion engine, by using a heat resistor and a temperature-compensating resistor which have temperature-dependence; the thermal airflow meter comprising:

a first base member with the heat resistor and the temperature-compensating resistor which making up a flow-rate measuring element;

a first temperature sensor provided on the first base member for measuring temperature thereon;

a second base member having a circuit for driving the heat resistor and the temperature-compensating resistor, and a signal processor for computing the airflow rate;

a casing installed at the wall of the intake air passage so as to be disposed in the intake air passage and holding the first base member at one extremity thereof while housing the second base member therein;

a second temperature sensor disposed on the second base member for measuring temperature thereon; and terminal electrodes disposed on the first and second base members, respectively, for electrical connection between electrical operation elements provided on the respective substrates, wherein the signal processor of the second base member has a function of receiving an output signal from the flow-rate measuring element and respective output signals from the first and second sensors to thereby compute the airflow rate on the basis of those signals.

9. The thermal airflow meter according to claim 8, wherein the airflow meter is configured so that the airflow rate signal computed by the signal processor inside the casing is outputted to an engine control unit disposed outside the thermal airflow meter.

10. The thermal airflow meter according to claim 1, wherein the temperature-compensating resistor doubles as the first temperature sensor.

* * * * *

UNITED STATES PATENT AND TRADEMARK OFFICE
CERTIFICATE OF CORRECTION

PATENT NO. : 7,269,999 B2  Page 1 of 1
APPLICATION NO. : 10/560896
DATED : March 5, 2004
INVENTOR(S) : H. Nakano et al.

It is certified that error appears in the above-identified patent and that said Letters Patent is hereby corrected as shown below:

ON THE TITLE PAGE

Please correct (22) PCT Filed to read as follows:

(22) PCT Filed: <u>Mar. 5, 2004</u>

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,269,999 B2 | Page 1 of 1 |
| APPLICATION NO. | : 10/560896 | |
| DATED | : September 18, 2007 | |
| INVENTOR(S) | : H. Nakano et al. | |

It is certified that error appears in the above-identified patent and that said Letters Patent is hereby corrected as shown below:

ON THE TITLE PAGE

Please correct (22) PCT Filed to read as follows:

(22) PCT Filed: <u>Mar. 5, 2004</u>

This certificate supersedes the Certificate of Correction issued August 19, 2008.

Signed and Sealed this

Twenty-third Day of September, 2008

JON W. DUDAS
*Director of the United States Patent and Trademark Office*